US010829858B2

(12) United States Patent
Fryda et al.

(10) Patent No.: US 10,829,858 B2
(45) Date of Patent: Nov. 10, 2020

(54) ELECTRODE ARRANGEMENT FOR ELECTROCHEMICALLY TREATING A LIQUID

(71) Applicant: CONDIAS GMBH, Itzehoe (DE)

(72) Inventors: Matthias Fryda, Itzehoe (DE); Thorsten Matthee, Hohenaspe (DE); Andrea Schmidt, Kremperheide (DE); Linda Heesch, Mehlbek (DE); Barbara Behrendt-Fryda, Itzehoe (DE)

(73) Assignee: CONDIAS GMBH, Itzehoe (DE)

( * ) Notice: Subject to any disclaimer, the term of this patent is extended or adjusted under 35 U.S.C. 154(b) by 64 days.

(21) Appl. No.: 15/121,067

(22) PCT Filed: Feb. 24, 2015

(86) PCT No.: PCT/EP2015/000415
§ 371 (c)(1),
(2) Date: Aug. 24, 2016

(87) PCT Pub. No.: WO2015/128077
PCT Pub. Date: Sep. 3, 2015

(65) Prior Publication Data
US 2016/0369413 A1    Dec. 22, 2016

(30) Foreign Application Priority Data
Feb. 25, 2014   (DE) .................. 10 2014 203 372

(51) Int. Cl.
*C25B 1/13*     (2006.01)
*C02F 1/461*    (2006.01)
(Continued)

(52) U.S. Cl.
CPC .............. *C25B 1/13* (2013.01); *C02F 1/4618* (2013.01); *C02F 1/4672* (2013.01);
(Continued)

(58) Field of Classification Search
CPC .. C25B 1/13; C25B 15/08; C25B 9/08; C25B 11/15; C02F 1/46114; C02F 1/78;
(Continued)

(56) References Cited

U.S. PATENT DOCUMENTS 4,425,216 A      1/1984   Neymeyer
8,337,958 B2*   12/2012   Cao ........................... C25C 7/02
                                                                    204/192.38
(Continued)

FOREIGN PATENT DOCUMENTS

CN    1463304 A    12/2003
CN    1530335 A     9/2004
(Continued)

*Primary Examiner* — Louis J Rufo
(74) *Attorney, Agent, or Firm* — W&C IP

(57) ABSTRACT

The invention relates to an electrode arrangement (10) for electrochemically treating a liquid. The electrode arrangement (10) has two electrodes (2), each of which has at least one electrode surface (4) and at least one through-flow chamber (34) with at least one inlet (22) and at least one outlet (24). The at least one through-flow chamber (34) is delimited on at least one first face by at least one electrode (2) which has a structure (8) on its electrode surface (4) such that a distance between the electrode surface (4) and a second through-flow chamber (34) face lying opposite the first face is varied. The invention is characterized in that the structure (8) forms at least 30% of the electrode surface (4) and is designed such that the distance between the electrode surface (4) and the second face increases and decreases multiple times along at least one direction, and the liquid flowing through the through-flow chamber (34) is mixed by means of the structure (8) and is set into a turbulent flow in particular.

15 Claims, 9 Drawing Sheets

(51) Int. Cl.
*C02F 1/467* (2006.01)
*C02F 1/78* (2006.01)
*C25B 9/08* (2006.01)
*C25B 11/12* (2006.01)
*C25B 13/02* (2006.01)
*C25B 15/08* (2006.01)
*C02F 103/04* (2006.01)

(52) U.S. Cl.
CPC ............ *C02F 1/46114* (2013.01); *C02F 1/78* (2013.01); *C25B 9/08* (2013.01); *C25B 11/12* (2013.01); *C25B 13/02* (2013.01); *C25B 15/08* (2013.01); *C02F 2001/46147* (2013.01); *C02F 2103/04* (2013.01); *C02F 2201/4611* (2013.01); *C02F 2201/46115* (2013.01); *C02F 2301/024* (2013.01)

(58) Field of Classification Search
CPC .................. C02F 1/4672; C02F 1/4618; C02F 2001/46147; C02F 2201/46115; C02F 2201/4611; C02F 2301/024; C02F 2103/04
See application file for complete search history.

(56) References Cited

U.S. PATENT DOCUMENTS

| | | | |
|---|---|---|---|
| 2003/0116431 A1 | 6/2003 | Johansson et al. | |
| 2004/0011665 A1 | 1/2004 | Koizumi et al. | |
| 2004/0226817 A1* | 11/2004 | Hosonuma | C23C 18/1216 204/280 |
| 2005/0109613 A1 | 5/2005 | Koizumi et al. | |
| 2007/0017801 A1* | 1/2007 | Fukui | C02F 1/4618 204/230.2 |
| 2007/0029190 A1* | 2/2007 | Hosonuma | B82Y 30/00 204/280 |
| 2009/0301865 A1* | 12/2009 | Yoshida | C02F 1/46109 204/242 |
| 2010/0006450 A1* | 1/2010 | Whitehead | C02F 1/46109 205/742 |
| 2010/0320082 A1* | 12/2010 | Kato | C25B 1/13 204/266 |
| 2015/0060267 A1* | 3/2015 | Mollart | C23C 16/56 204/294 |

FOREIGN PATENT DOCUMENTS

| | | |
|---|---|---|
| CN | 1780938 A | 5/2006 |
| CN | 101928954 A | 12/2010 |
| CN | 102140648 A | 8/2011 |
| DE | 2313683 A1 | 10/1974 |
| DE | 100 25 167 A1 | 12/2001 |
| DE | 10025167 A1 | 12/2001 |
| GB | 2483769 A | 3/2012 |
| GB | 2490912 A | 11/2012 |
| JP | 2004130262 A | 4/2004 |
| WO | 2004/079051 A1 | 9/2004 |

* cited by examiner

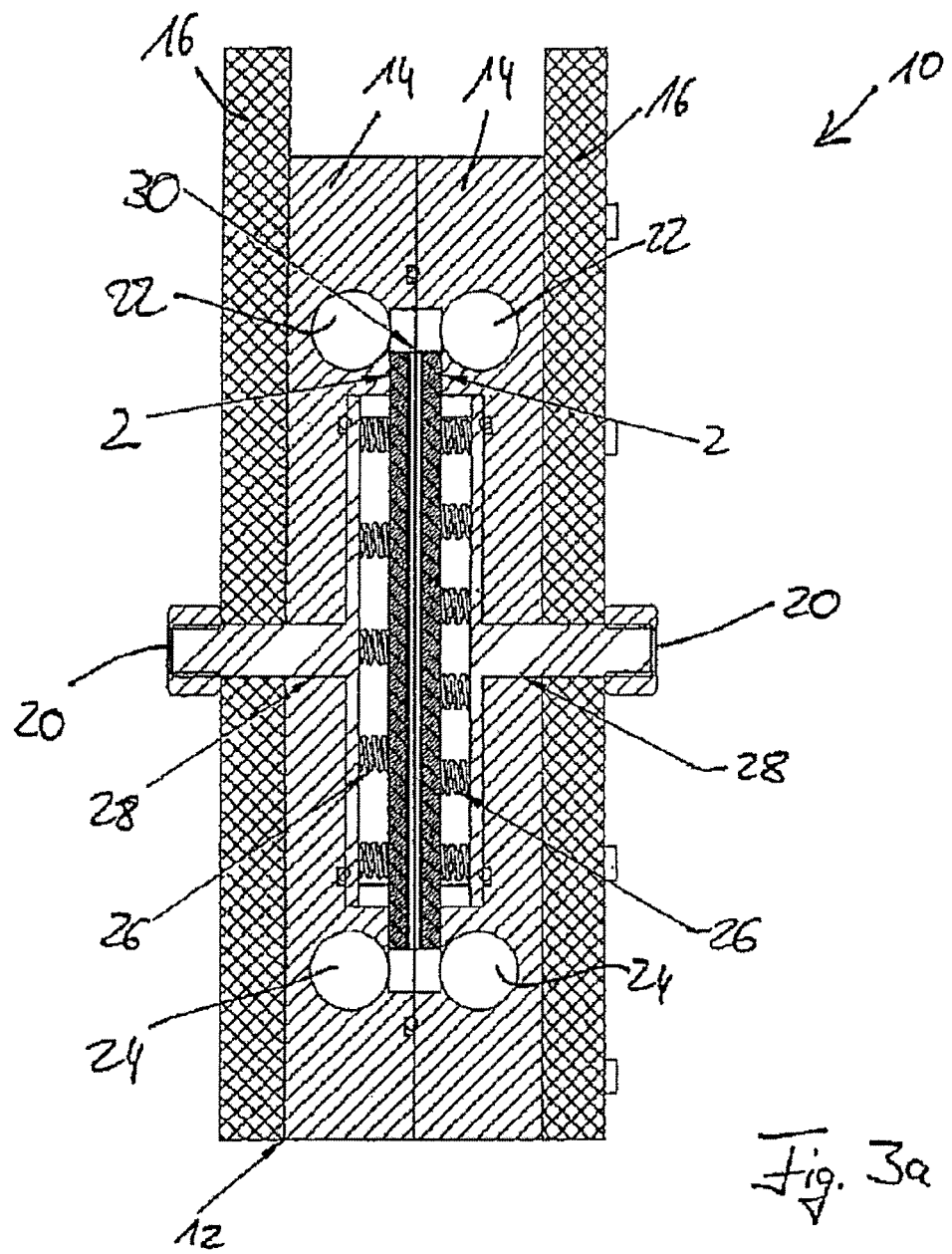

ELECTRODE ARRANGEMENT FOR ELECTROCHEMICALLY TREATING A LIQUID

FIELD OF THE INVENTION

The invention concerns an electrode arrangement for electrochemically treating a liquid, wherein the electrode arrangement has two electrodes, each of which has at least one electrode surface and at least one through-flow chamber with at least one inlet and at least one outlet, wherein the at least one through-flow chamber is delimited on at least one first side by at least one electrode which has a structure on its electrode surface such that a distance between the electrode surface and a second side of the through-flow chamber opposite the first side varies. The invention also concerns an electrode for such an electrode arrangement and a method for operating such an electrode arrangement. The invention also concerns a method for producing ozonated water by means of such an electrode arrangement.

BACKGROUND

A device of the type in question is known, for example, from EP 1730080 B1. In a method for operating the device, water is fed through the at least one through-flow chamber, flowing in through the inlet in the through-flow chamber and out through the outlet of the through-flow chamber. In the through-flow chamber, it comes into contact or at least into spatial proximity with electrodes to which an electrical voltage is applied so that water molecules between the individual electrodes are split into ions.

An electrode arrangement and an electrode for electrochemical ozone production are known, for example, from DE 29916125 U1. The water molecules are decomposed by hydrolysis, and ozone can be obtained from the oxygen ions to be generated in the water. Ozone is suitable as an oxidant for the cleaning, disinfection, and sterilization of surfaces, so that water ozonated in this manner, which can be used for disinfecting surfaces, is produced.

Methods are known from DE 19922665 A1 and the aforementioned DE 29916125 U1 which use as electrodes, for example, diamond electrodes having a fine crystalline diamond layer on the surface of a three-dimensional base structure. In prior art, however, other electrode forms, for example grid electrodes such as lead dioxide or platinum grid electrodes, are used as electrode arrangements.

Other configurations of corresponding electrode arrangements are known, for example from U.S. Pat. No. 7,074,316 B2 and U.S. Pat. No. 6,565,736 B2.

In addition to the above-described plate and grid electrodes for electrochemical reactions, three-dimensional packed-bed electrodes comprising a fill of packed particles are occasionally used. The object is to provide the electrolyte decomposed into ions on dissolution in water with an electrode surface that is adapted to the electrolyte and has the largest possible surface area. However, in the case of metal electrodes and other catalytically-acting electrode materials in particular, in which the electrochemical reactions are potential-controlled, it must be taken into consideration that structured electrodes cause inhomogeneous distribution of the electrical field on the surface of the electrode, so that the respective amount of reaction products converted per unit area also fluctuates.

Provided that no secondary reactions or mixtures of the electrolyte ions are required, the method known from prior art is successful. However, if it is necessary to achieve homogenous distribution of the electrolyte ions in the liquid, or a secondary reaction of the ions produced is desired, mass transport phenomena such as diffusion should be considered. In this case, these phenomena constitute a limitation of electrochemical efficiency, for example because diffusion can only take place very slowly in water.

SUMMARY

The object of the invention is therefore to propose an electrode arrangement and an electrode for such an arrangement by means of which electrochemical efficiency can also be increased in cases where secondary reactions and/or mixtures are required. The invention also proposes a method for operating such an electrode arrangement and a method for producing ozonated water with such an electrode arrangement.

The invention achieves the object in question by means of an electrode arrangement according to the generic portion of claim 1, characterized in that the structure forms at least 30% of the electrode surface and is configured such that the distance between the electrode surface and the second side increases and decreases multiple times along at least one direction, and the liquid flowing through the through-flow chamber is mixed by means of the structure and is caused in particular to flow in a turbulent manner. The structure has a depth of at least 0.2 mm. This means that the distance between the electrode surface and the opposite side of the chamber increases and decreases multiple times in at least one direction by at least 0.2 mm.

Here, the electrode surface refers to the actual surface of the electrode, i.e. the surface which comes into contact with a liquid in use of the electrode arrangement as intended. For example, if the structure has at least one rectangular groove made in the electrode, both the bed or bottom of said groove and the side walls thereof are included in the electrode surface, as they come into contact with liquid in use of the electrode arrangement as intended. The electrode surface is thus enlarged compared to a smooth surface. Here, a structure is understood to refer to anything which enlarges the electrode surface compared to a flat surface having the same external dimensions, i.e. in particular elevations and/or recesses. The flat surface having the same external dimensions as the electrode is referred to below as the surface area of the electrode and therefore by definition has no structures.

In conventionally-used grid electrodes or plate electrodes, the liquid flows parallel to the electrode surface, so that the flow rate of the medium declines with decreasing distance to the electrode surface. As a result, mass transport phenomena must be taken into consideration and in particular constitute the limiting factor. The same applies for apertured electrodes, known from prior art, in which the liquid flows perpendicularly to the electrode surface through apertures in the electrodes, wherein a uniform and laminar flow is also preferred in order to allow the largest possible amount of liquid to flow through the electrodes. In this configuration, the flow rate of the medium also declines with decreasing distance to the electrode surface. In all of these cases, however, as the ions are produced very close to the electrode surface, no mixing or other distribution of the ions occurs.

In contrast to these configurations, in the electrode arrangement according to the invention, a large portion of the electrode surface, specifically at least 30%, is formed by the structure on the electrode surface, which is configured such that the liquid flowing through the through-flow chamber is mixed and caused to flow in a turbulent manner. This allows the mass transport limitations to be overcome and increases the efficiency of the electrochemical process. The liquid flows directly past the electrochemically active electrode surfaces, and the ions produced are particularly rapidly and homogeneously distributed in the liquid by means of the turbulent flow and mixing of the liquid. This therefore obviates the need to take into account diffusion of the ions in the liquid.

According to the invention, the structure is configured such that the distance between the electrode surface and the second side, which delimits the through-flow chamber on the side opposite the electrode, increases and decreases multiple times along at least one direction. For example, this at least one direction may be the through-flow direction. The structure advantageously comprises a plurality of recesses, which may have virtually any form desired. If a plurality of these recesses, which may be identical to or different from one another, is arranged successively along the at least one direction, this produces the effect desired, such that the distance between the electrode surface and the second side of the through-flow chamber increases and decreases multiple times. It has been found to be advantageous if said distance increases and decreases multiple times in more than only this one direction. In a preferred configuration, the electrode surface is provided with a structure which ensures that in each direction extending parallel to the electrode surface, the distance between said electrode surface and the opposite second side of the through-flow chamber increases and decreases multiple times. In this case, it is also conceivable for there to be areas in which the distance becomes zero, so that the electrode surface touches the opposite side wall. In this case, it is of course important for the electrical insulation between the two electrodes of the electrode arrangement to be retained. For example, areas in which the distance between the electrode surface and the opposite second side becomes zero may be distributed in a linear or island-like manner throughout the through-flow chamber. In this case, the form of the structure and the structural elements forming the structure actually selected depends on the reactions desired, the liquids used, the required flow volume, and the electrical voltages or current to be applied.

The structure, which as described above may be composed of a plurality of structural elements, is consequently understood within the meaning of this application to refer to the portion of the electrode surface in which the distance between the electrode surface and the opposite second side of the through-flow chamber varies, i.e., increases and decreases multiple times along at least one direction.

Advantageously, the structure forms at least 50%, preferably at least 60%, more preferably at least 75%, and particularly preferably at least 90% of the electrode surface. Electrodes whose structure forms 100% of the electrode surface are also possible. Accordingly, the structures on the electrode surface influence the hydrodynamics of the liquid flowing through the at least one through-flow chamber, such that for example a static mixer can be integrated into the active electrode surface. In the optimum case, the respective structure on the electrode surface is adapted to the respective electrolyte volume flow and the specific reactions. For example, the electrochemical reaction can be forced into hydrodynamically relevant zones by means of specific covers, for example the seals required for this purpose. This allows mixing to be further optimized so that the efficiency of the electrochemical reactions can be further increased.

In a preferred configuration, the introduced structure comprises a plurality of linear channels, which for example can be configured as V-grooves. The depths of these channels are e.g. 0.5 mm, 0.8 mm, or 1.6 mm. By means of these structures, the actual electrode surface is enlarged compared to the surface area of the respective electrode, i.e. a flat area having the same dimensions as the electrode. The ratio of the actual electrode surface and surface area of the electrode is e.g. 1:24, 1:384, or 1:768. For example, if recesses are used that are semicircular, this factor may be 3.

The at least one electrode is preferably a diamond electrode. It is particularly preferred for all of the electrodes used to be diamond electrodes.

In conventional catalytically active electrode materials, which are used for example in metal, graphite, or mixed oxide electrodes, the structuring affects the configuration of the electric field at one electrode relative to the counter electrode. The strength of the electric field varies along the surface of the electrode such that electrolyte ions are produced in an inhomogenous manner. Even in cases where the above-mentioned materials are also used for a device described here according to an embodiment of the present invention, diamond electrodes are preferred to these materials. Diamond electrodes have a base element composed of a substrate such as silicon to which a polycrystalline diamond layer is applied. These non-catalytically active electrodes can be operated in a power-controlled manner, so that despite the structuring, more homogenous distribution of the electric field over the surface of the electrode can be ensured. In this manner, the advantages of the present invention are fully realized without the drawback of inhomogenous field distribution, which causes inhomogenous ion production.

The electrode arrangement preferably has two through-flow chambers, each of which is delimited on at least one first side by at least one electrode, having on their electrode surface a structure such that a distance between the electrode surface and a second side of the respective through-flow chamber opposite the first side varies. This allows mixing and turbulent flow to be achieved in the two adjacent through-flow chambers, so it is not necessary to consider mass transport phenomena as a limitation of electrochemical efficiency. In this case, electrodes may for example be identical for the two through-flow chambers, or they may be configured with differing structures. They may be composed of the same or different materials. Of course, the two electrodes should preferably be diamond electrodes having a structure adapted to the respective liquid volume flow and the desired reactions and reaction products.

In a preferred configuration, the two through-flow chambers are separated by a membrane which forms the respective second side of the two through-flow chambers. It is particularly advantageous if this membrane is an ion-selective membrane such as those known per se from prior art. In this manner, a wide variety of different reactions can be utilized, and a large number of different ions can be produced.

Advantageously, a third through-flow chamber is located between the two through-flow chambers which is separated by one membrane respectively from the first through-flow chamber and the second through-flow chamber. In a preferred embodiment, the two membranes can be configured to be ion-selective, with these two membranes preferably allowing different ions to pass. In this manner, different reactions can be carried out in the three adjacent chambers which take place in a controlled manner and therefore result in the production of different reaction products and ions in the respective liquids. By this method, different products can be produced at the same time, optionally as results of the same reaction.

The structure preferably has a plurality of recesses, grooves, or slots, which in particular can be of varying width. These can be channels with a defined width and depth, wherein the width and/or depth may vary along the course of the respective channels. Channels of constant width and depth are also possible. The channels can be arranged parallel to one another, crossing one another, preferably at an angle of 90 degrees, or can for example be of a wavelike or curved shape. The distances between the individual recesses, slots, or channels may be selected so as to be the same over the entire electrode surface or varying. For example, it can be advantageous if more structure-forming elements are present in certain areas of the electrode surface than in other areas of the surface. In this way, it is possible in a targeted manner to achieve areas with turbulent flow and favorable mixing of the liquid flowing through the through-flow chambers which alternate with areas of calmer, laminar flow.

In a preferred configuration, the structure has a plurality of recesses which in particular can overlap one another and are configured for example in the form of spherical surface segments. Accordingly, these are recesses in which the electrode surface is curved in the form of spherical surface segments, preferably inward, i.e. away from the wall of the through-flow chamber opposite the electrode. If several such recesses overlap one another, this means that a boundary line surrounding a respective recess is not circular. In addition, such a line does not lie in a constant plane. Of course, it is also conceivable to configure the recesses in the shape not of spherical surface segments, but for example in polygonal, paraboloid, or irregular shapes. It is also possible in this case for areas of greater recess density, in which more recesses are therefore present in a specified surface section, to alternate with areas of lower recess density, in which the number of recesses per unit area is therefore lower. It is also possible in this manner to influence the flow inside the through-flow chamber and specifically tailor it to the desired parameters.

The invention also achieves the object in question by means of an electrode for such an electrode arrangement.

The invention also achieves the object in question by means of a method for operating such an electrode arrangement, characterized in that the liquid is fed through the at least one inlet in the at least one through-flow chamber, mixed in the through-flow chamber by means of the structure on the electrode surface, and caused in particular to flow in a turbulent manner, and flows out of the at least one through-flow chamber through the at least one outlet. In this case, it is sufficient if the liquid flowing through the through-flow chamber is mixed at least in certain areas by means of the structure on the electrode surface and is caused in particular to flow in a turbulent manner. The dimensions of the various electrodes and the special form and configuration of the structure can be adapted based on the desired reactions, the input and output products, and the desired flow volume.

A liquid is advantageously fed through each of the through-flow chambers, with different amounts of the respective liquid being fed through the different through-flow chambers. For example, if the structure on the electrode surface of at least one of the electrodes is selected in such a manner that on the one hand, a large electrode surface is present, so that a large quantity of ions and/or reaction products is produced, and on the other, the structure allows this large quantity of ions or reaction products to be distributed particularly rapidly, favorably, and as homogenously as possible in the liquid inside the one through-flow chamber, this simultaneously ensures that a large quantity of reaction products and/or ions are fed to the membrane, which is ion-selective in a particularly advantageous configuration. This also sharply increases the number of ions which pass through the membrane and thus reach the respective other through-flow chamber. As the number of ions passing into the respective other through-flow chamber is increased in this manner, the flow volume in the respective other through-flow chamber is also increased. This improves the efficiency of the method and at the same time reduces the amount of waste water to be disposed of.

The invention also achieves the object in question by means of a method for producing ozonated water with such an electrode arrangement in which pure water, in particular distilled water or ultrapure water, is fed through the first through-flow chamber and the second through-flow chamber, the pure water, in particular distilled water or ultrapure water, is mixed in the through-flow chambers by means of the structures on the electrode surfaces and is caused in particular to flow in a turbulent manner, and electrical voltage is applied to the electrodes, so that ozonated water forms in one of the through-flow chambers.

It is advantageous for the anode and the cathode to have different structures. This makes it possible in a particularly simple manner to adapt the electrode surfaces to the respective requirements and needs, which depend for example on the flow volume, the desired concentration, and the ions used. Moreover, in the configuration described here, the membranes fit onto the electrodes over a larger area than is possible, for example, in the case of the grid electrodes known from prior art. On the one hand, therefore, the contact between the electrode and the membrane is improved, and on the other, the thermal and/or mechanical stress on the membranes to which the electrodes are exposed is reduced.

In an illustrative configuration of the method for producing ozonated water, demineralized water is directly fed through the anode chamber of the electrolysis cell. In this case, electrolysis at the anode causes the demonstrable production of ozone, from a current of approx. 2 A, equivalent to a current density of approx. 14 mA/cm$^2$, and the dissolution thereof in water. The production of ozone rises linearly with increasing current. The amount of ozone produced per selected time unit is largely independent of the volume flow of the liquid fed through the chambers. Of course, different volume flows will result in different hydrodynamic states, with the result that a greater or lesser amount of the gaseous ozone can be dissolved in the water. A higher volume flow leads to greater turbulence in the respective chamber and thus to smaller gas bubbles of the ozone produced at the anode surface. Because of the smaller gas bubbles, the contact surface or interface between the gaseous ozone and the surrounding water is increased, allowing more ozone to be dissolved in the water.

Accordingly, in order to dissolve as much ozone as possible in a specified amount of water, it is not necessarily advisable to reduce the flow rate of the water in order to ensure that the water remains in contact with the anode surface for as long as possible. Under certain circumstances, it is more advisable to select a higher flow rate so that a higher percentage of ozone can be dissolved in the water. In the event that it is not possible in this manner to achieve a sufficient ozone concentration in the water, the water can again be fed through the anode chamber, thus increasing the ozone concentration. However, it should be borne in mind that ozone naturally decomposes into oxygen in water.

BRIEF DESCRIPTION OF THE DRAWINGS

Embodiments of the present invention are described in further detail with reference to the attached drawings. The figures are as follows:

FIGS. 3a and 3b show two sectional views through the electrode arrangement shown in FIG. 2.

DETAILED DESCRIPTION

Figure 1A:
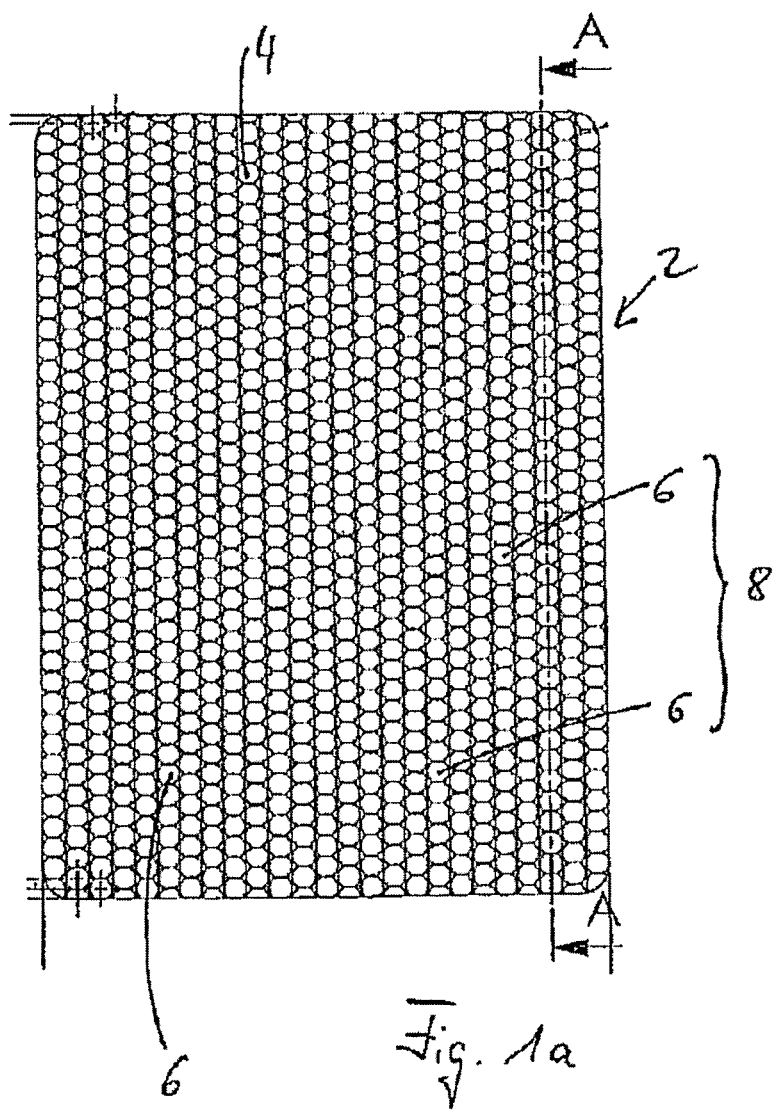
FIGS. 1a through 1d show an electrode according to a first embodiment of the present invention in various views.

FIG. 1a shows an electrode 2 with a view of the electrode surface 4. The electrode surface 4 has a plurality of recesses 6, which in the embodiment shown are configured in the form of spherical surface segments. Together, the recesses 6 form a structure 8 of the electrode surface 4. It can be seen that the individual recesses 6 overlap one another, such that the boundary lines of the recesses 6 shown in FIG. 1a do not have a precisely circular configuration.

Figure 1B:
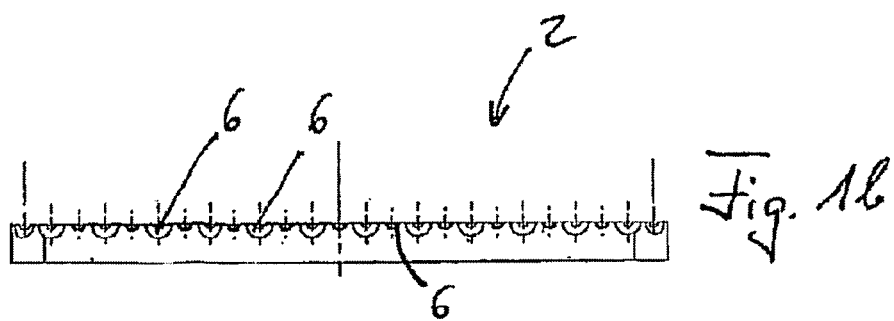

FIG. 1b shows a side view of the electrode 2. One can see the individual recesses 6 which are arranged adjacent to one another and are shown in the side view with differing depths. Between the individual recesses 6 are areas in which the electrode surface 4 has no recesses 6.

The electrode 2 should preferably be a diamond electrode, which has the advantages described above.

Figure 1C:
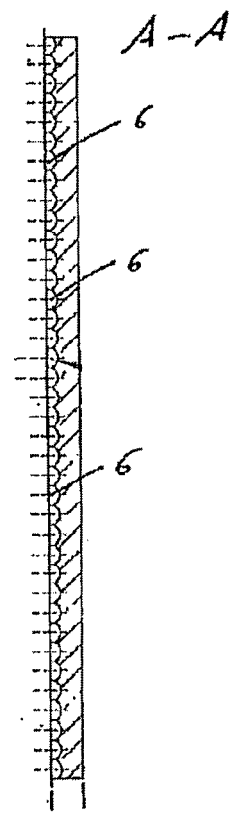

FIG. 1c shows a sectional view along line A-A of FIG. 1a. It can be seen here that the individual recesses 6 overlap one another, such that the structures formed between two adjacent recesses 6 do not reach the full height of the electrode surface 4 as is present for example between two adjacent lines of recesses 6.

Figure 1D:
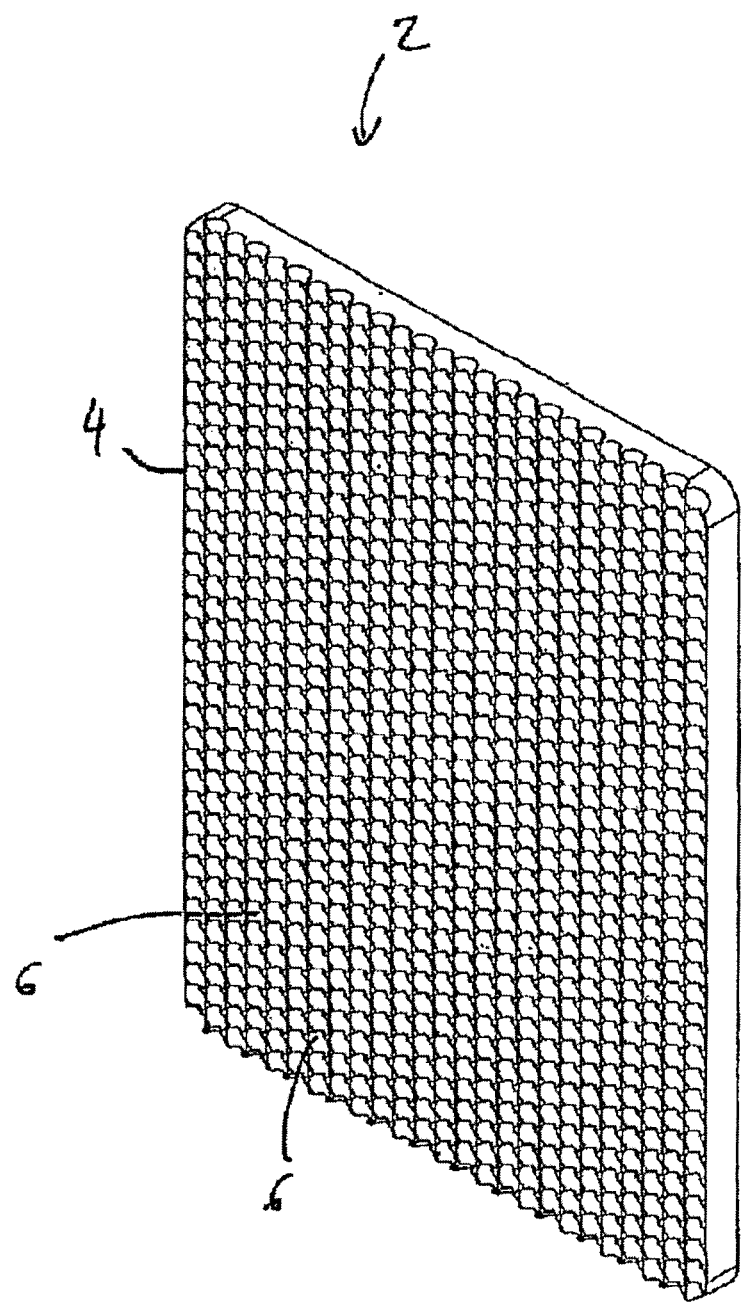

FIG. 1d shows a schematic three-dimensional view of the electrode 2 with the plurality of recesses 6. Of course, the recesses 6 can also have other geometric shapes, and they do not have to be regularly arranged.

Figure 2:
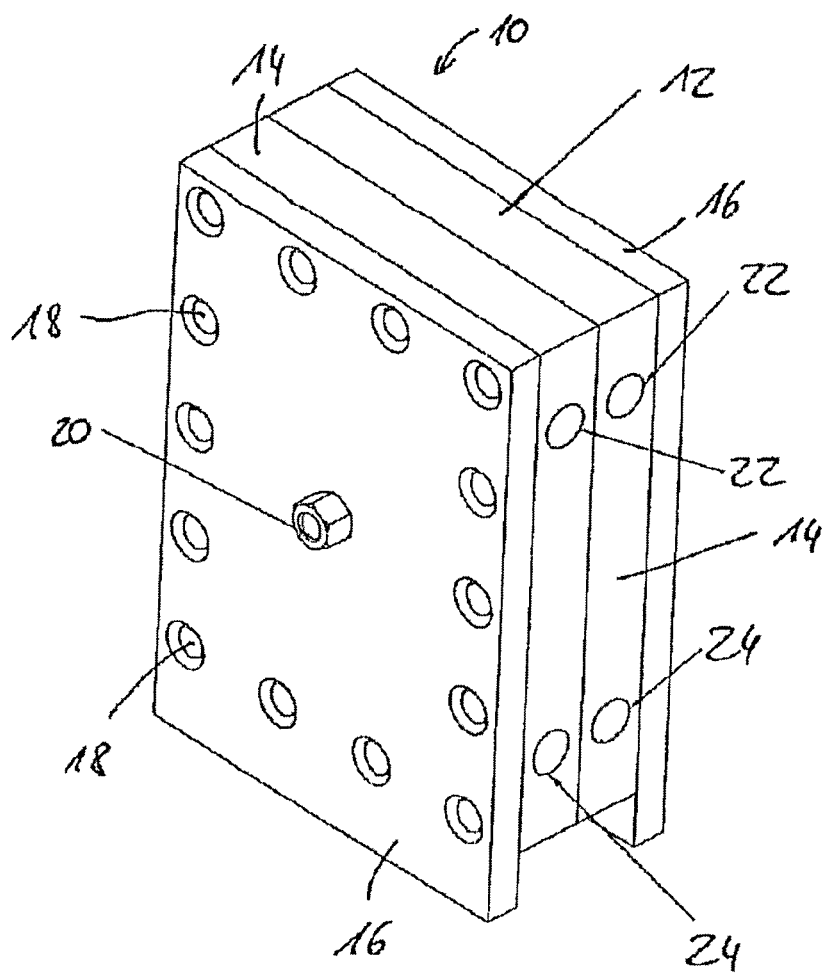
FIG. 2 is a schematic view of an electrode arrangement according to an embodiment of the present invention.

FIG. 2 shows an electrode arrangement 10 arranged in a housing 12. In the embodiment shown, the housing 12 consists of two chamber housings 14 and is delimited by two cover plates 16. The cover plates have bore holes 18 which are aligned with the bore holes in the chamber housings 14, such that by using screw connections, for example, the individual components can be securely fastened to one another.

In the center of the front cover plate 16 is an electrical connection 20 by means of which one of the two electrodes 2 arranged in the housing 12 can be supplied with electric current or electrical voltage. In the embodiment shown, the rear cover plate 16 has an analogous electrical connection 20.

Each of the individual chamber housings 14 also has an inlet 22 and an outlet 24 through which the liquid to be electrochemically treated can be allowed to flow into or out of the chamber housings 14.

Figure 3B:
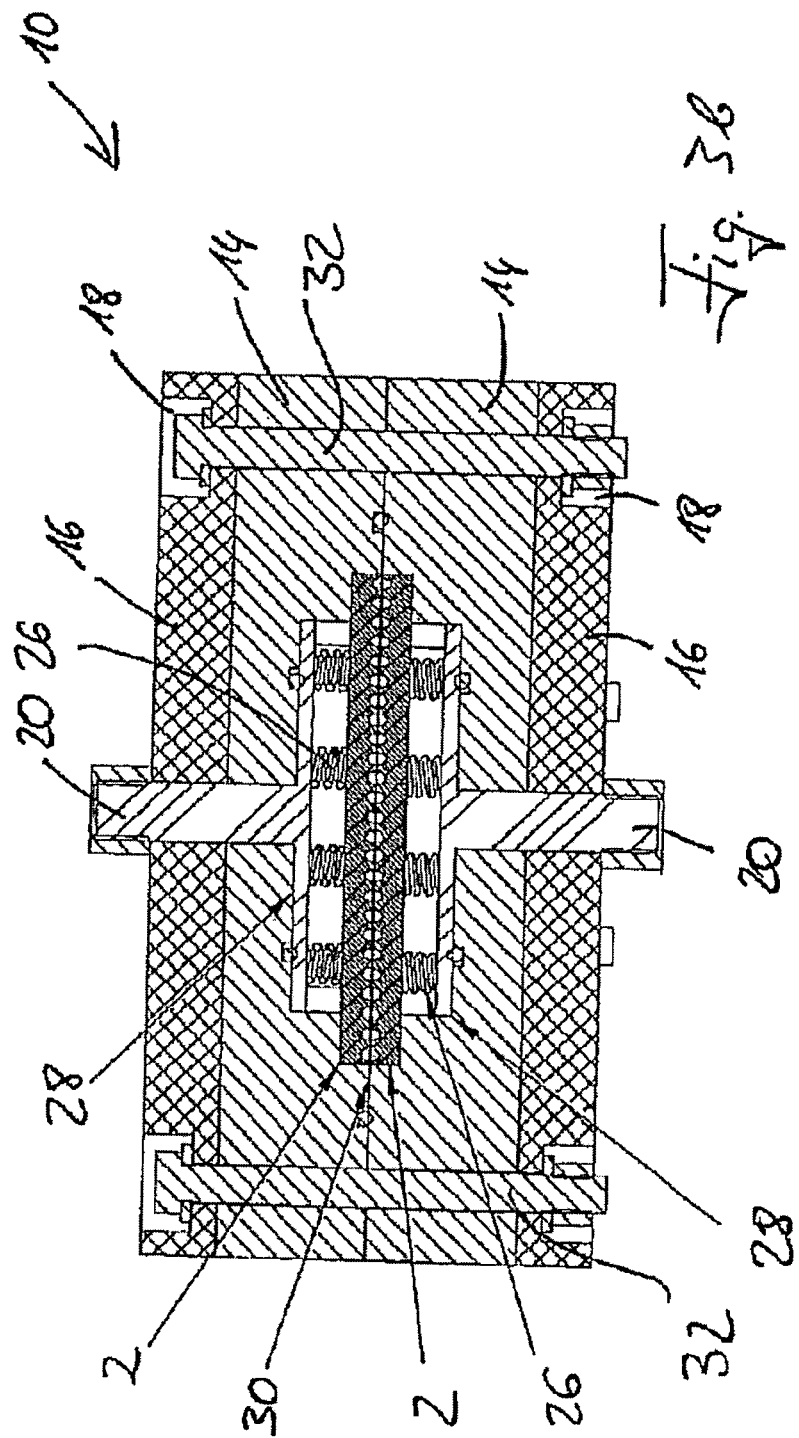

FIGS. 3a and 3b show sectional views through the electrode arrangement 10 shown in FIG. 2. FIG. 3a shows a longitudinal section. One can first see the two chamber housings 14 with the inlets 22 and outlets 24 and the cover plates 16 with the electrical connections 20. In the inside are two electrodes 2 which can be supplied with an electric current and an electrical voltage via contact springs 26 and contact plates 28 which are electrically connected to the electrical connections 20. Between the two electrodes 2 is a membrane 30 by means of which the two through-flow chambers are separated from each other.

The electrode arrangement 10 shown in FIG. 3a has two through-flow chambers. The liquid to be treated flows through the respective inlet 22 into the respective through-flow chamber, where it comes into contact with the electrode 2 belonging to the respective through-flow chamber or at least with the electric field created by the electrodes 2. The electrochemical treatment is carried out in this manner. After this, the liquid is discharged through the respective outlet 24. The two through-flow chambers, not shown in FIG. 3a, are therefore delimited on the respective outer side by the electrode 2 and on the opposite inner side by the membrane 30, which in particular can advantageously be an ion-selective membrane. This allows certain ions to pass from one through-flow chamber into the other through-flow chamber.

FIG. 3b shows a section through the electrode arrangement 10 with its chamber housings 14 and the cover plates 16. In this case as well, electrodes 2, contact springs 26, contact plates 28, and electrical connections 20 are shown. The membrane 30 which separates the through-flow chambers, also present in FIG. 3b, from each other runs between the two electrodes 2.

FIG. 3b also shows bore holes 18 in the cover plates 16 through which screws 32 are guided in order to securely fasten the cover plates 16 and the chamber housings 14 to one another. The structure 8 on the respective inner side of the electrode 2, which forms the electrode surface 4, can also be seen in FIG. 3b.

Figure 4:
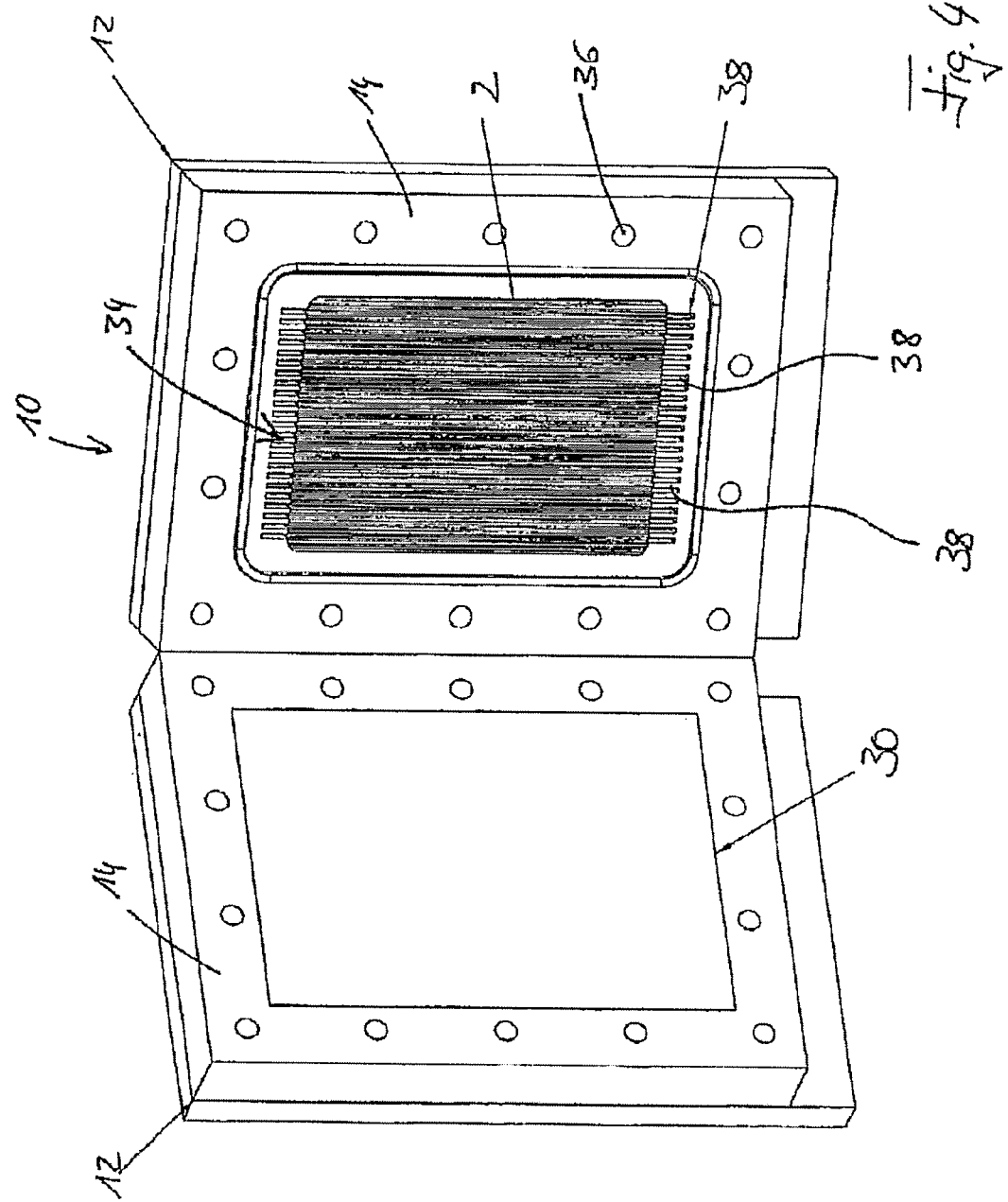
FIG. 4 shows the electrode arrangement of FIG. 2 when opened.

FIG. 4 shows the electrode arrangement 10 when opened. It thus provides a view into a through-flow chamber 34. It can also be seen in FIG. 4 that the chamber housing 14 also has bore holes 36 which can be aligned over the bore holes 18 in the cover plates 16.

On the chamber housing 14 shown on the right in FIG. 4 can be seen the electrode 2, which has longitudinal slots running in FIG. 4 from top to bottom that combine to form the structure 8. The liquid, specifically the water to be treated, flows into the through-flow chamber 34 via the inlet 22, not shown in FIG. 4, and is guided by guide elements 38 over the electrode surface 4.

On the chamber housing 14 shown on the left in FIG. 4, the membrane 30 is arranged, which, when the electrode arrangement 10 is closed, delimits the through-flow chamber 34 on the side opposite the electrode 2.

Figure 5:
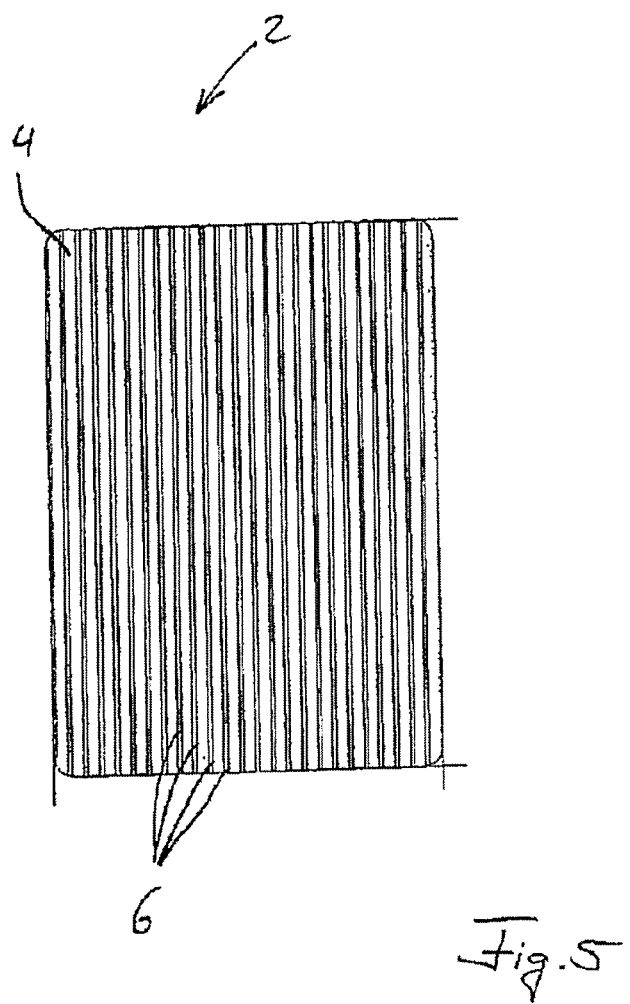
FIG. 5 is a schematic top view of an electrode.

FIG. 5 shows a further schematic top view of an electrode 2, which shows recesses 6 on the electrode surface 4. It can be seen in FIG. 5 that the electrode 2 has a length and width which correspond to the overall dimensions of the electrode shown in FIG. 5. A flat surface with the same dimensions would correspond to the surface area of the electrode 2.

Figure 6A:
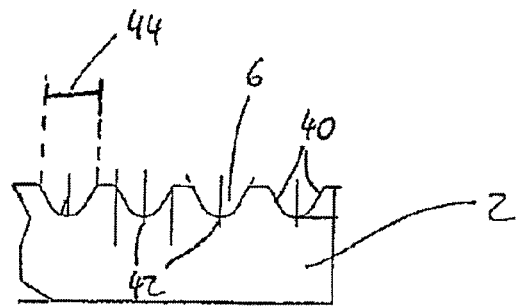
FIGS. 6a through 6c are sectional views through the variously configured electrodes according to FIG. 5.
Figure 6B:
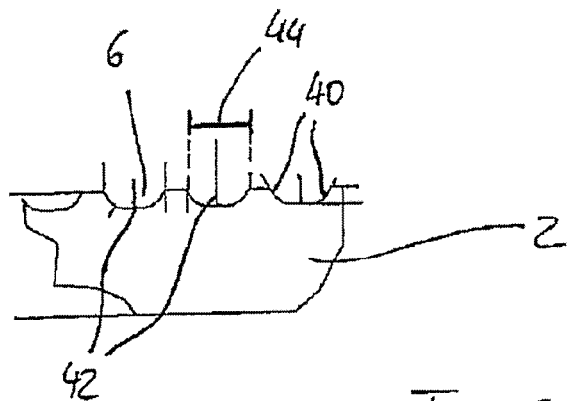
Figure 6C:
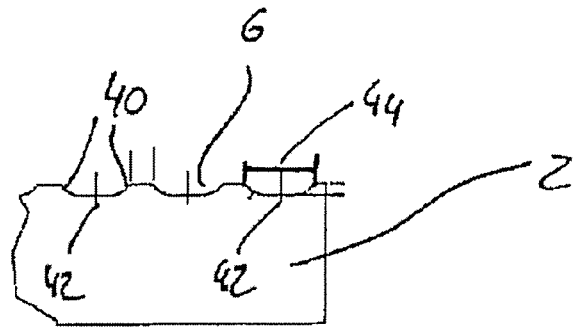

FIGS. 6a through 6c show views of sections through the electrode 2 shown in FIG. 5, wherein the individual recesses 6 which combine to form the structure 8 are differently configured. In FIGS. 6a through 6c, the individual recesses 6 are longitudinal grooves. In FIGS. 6a and 6b, the grooves have chamfered walls 40, which in the embodiments include 60° angles. Each of the grooves has a groove center 42 relative to which the grooves are configured in mirror symmetry. In the embodiments according to FIGS. 6a and 6b, the distances between two adjacent groove centers 42 are equal, with an example of this distance being 4 mm. However, the grooves in FIGS. 6a and 6b have different depths. While the embodiment shown in FIG. 6a has e.g. a groove depth of 1.6 mm, the individual grooves in FIG. 6b are only 0.8 mm deep. A groove width 44 is identical in the two embodiments, and is for example 3 mm, such that the distance between two adjacent grooves is 1 mm. Of course, grooves with other angles of inclination of the walls 40, other distances between one another, and other groove widths 44 are also conceivable.

FIG. 6c shows a structure composed of relatively flat grooves, for example with a depth of 0.5 mm. These grooves also have a groove center 42 and a groove width 44 of 3 mm. In the embodiment shown, however, the walls 40 are cross-sectionally configured in the form of spherical surface segments, for example having a radius of 1 mm.

LIST OF REFERENCE NUMBERS

2 Electrode
4 Electrode surface
6 Recess
8 Structure
10 Electrode arrangement
12 Housing
14 Chamber housing
16 Cover plate
18 Bore hole
20 Electrical connection
22 Inlet
24 Outlet
26 Contact spring
28 Contact plate
30 Membrane
32 Screw
34 Flow-through chamber
36 Bore hole
38 Guide element
40 Wall
42 Slot center
44 Slot width

The invention claimed is:

1. An electrode arrangement for electrochemically treating a liquid, comprising:
two apertureless diamond electrodes, each of which has at least one electrode surface; and
at least one through-flow chamber with at least one inlet and at least one outlet,
wherein the at least one through-flow chamber is delimited on a first side by at least one diamond electrode of the two diamond electrodes,
wherein a structure on the at least one electrode surface of each of the two diamond electrodes comprises a multiplicity of recesses, grooves, or slots, such that a distance between the at least one electrode surface and a second side of the at least one through-flow chamber opposite the first side varies,
wherein the structure forms at least 30% of the at least one electrode surface and is configured such that a distance between the at least one electrode surface and the second side increases and decreases multiple times along at least a flow-through direction, and such that liquid flowing through the through-flow chamber is mixed in the through-flow chamber by the structure.

2. The electrode arrangement as claimed in claim 1, wherein the structure forms at least 50%, of the at least one electrode surface.

3. The electrode arrangement as claimed claim 1 wherein the at least one through-flow chamber includes two through-flow chambers each of which is delimited on their first side by a respective at least one diamond electrode.

4. The electrode arrangement as claimed in claim 1 wherein the structure has a plurality of recesses configured in the form of spherical surface segments overlapping one another such that the boundary lines of the recesses do not have a precisely circular configuration.

5. The electrode arrangement of claim 4 wherein the multiplicity of grooves, recesses, or slots are configured in a form of spherical surface segments.

6. The electrode arrangement of claim 1 wherein the structure is configured to cause the liquid flowing through the through-flow chamber to flow in a turbulent manner.

7. The electrode arrangement of claim 1 wherein the structure forms at least 90% of the at least one electrode surface.

8. The electrode arrangement of claim 1 wherein the multiplicity of grooves, recesses, or slots vary in width.

9. The electrode arrangement as claimed in claim 1, wherein the multiplicity of recesses, grooves, or slots are channels that are one or more of: arranged parallel to another, crossing one another at an angle, wavelike, or curved.

10. The electrode arrangement as claimed in claim 1, wherein the multiplicity of recesses, grooves, or slots are channels that have varying width and/or depth along the course of the channels.

11. The electrode arrangement as claimed in claim 1, wherein the multiplicity of recesses, grooves, or slots are a plurality of channels that overlap one another.

12. A method for operating an electrode arrangement for electrochemically treating a liquid, comprising
two apertureless diamond electrodes, each of which has at least one electrode surface; and
at least one through-flow chamber with at least one inlet and at least one outlet,
wherein the at least one through-flow chamber is delimited on a first side by at least one diamond electrode of the two diamond electrodes,
wherein a structure on the at least one electrode surface of each of the two diamond electrodes comprises a multiplicity of recesses, grooves, or slots, such that a distance between the at least one electrode surface and a second side of the through-flow chamber opposite the first side varies,
wherein the structure forms at least 30% of the at least one electrode surface and is configured such that a distance between the at least one electrode surface and the second side increases and decreases multiple times along at least a flow-through direction, and such that liquid flowing through the through-flow chamber is mixed by the structure, said method comprising:
feeding the liquid through the at least one inlet in the at least one through-flow chamber;
mixing the liquid in the through-flow chamber using the structure on the at least one electrode surface so as to cause the liquid to flow in a turbulent manner; and
flowing the liquid out from the at least one through-flow chamber through the at least one outlet.

13. The method as claimed in claim 12, wherein there at least one through-flow chamber includes a plurality of through-flow chambers, and the feeding step feeds the liquid through every through-flow chamber, wherein different amounts of the liquid are fed through different through-flow chambers.

14. A method for producing ozonated water with an electrode arrangement comprising
   two apertureless diamond electrodes, each of which has at least one electrode surface; and
   at least a first electrode through-flow chamber and a second electrode through-flow chamber, each of which has at least one inlet and at least one outlet,
   wherein each of the first and second electrode through-flow chambers are delimited on a first side by at least one diamond electrode of the two electrodes,
   wherein a structure on the at least one electrode surface of each of the two diamond electrodes comprises a multiplicity of recesses, grooves, or slots, such that a distance between the at least one electrode surface and a second side of the respective through-flow chamber opposite the first side varies,
   wherein the structure forms at least 30% of the at least one electrode surface and is configured such that a distance between the at least one electrode surface and the second side increases and decreases multiple times along at least a flow-through direction, and such that liquid flowing through each of the first and second through-flow chambers is mixed by the structure, said method comprising
   feeding pure water through the first through-flow chamber and the second through-flow chamber,
   mixing the pure water in the first and second through-flow chambers using the structure on the at least one electrode surface so as to cause the pure water to flow in a turbulent manner; and
   supplying the first and second electrodes with electrical voltage such that ozonated water forms in at least one through-flow chamber of the first and second through-flow chambers.

15. The method of claim 14 wherein the pure water is selected from the group consisting of distilled water and ultrapure water.

* * * * *